United States Patent Office 3,427,880
Patented Feb. 18, 1969

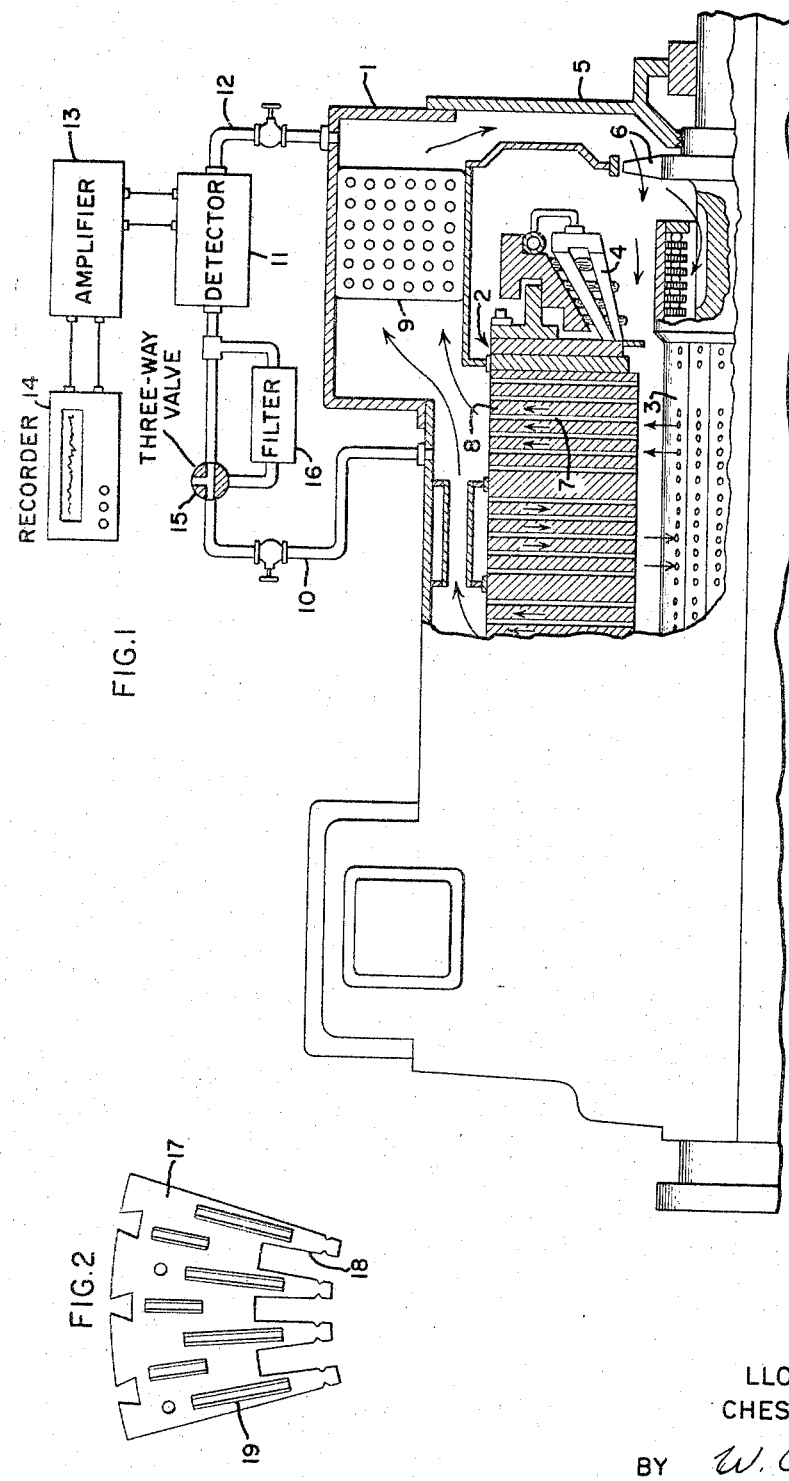

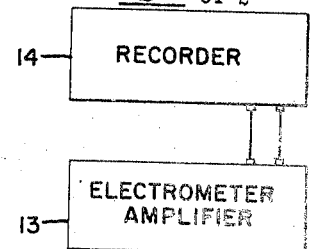
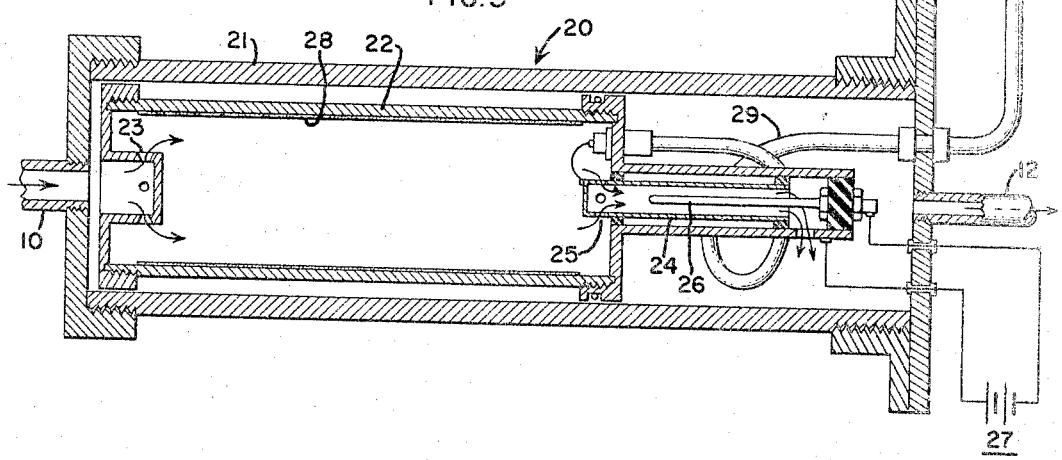
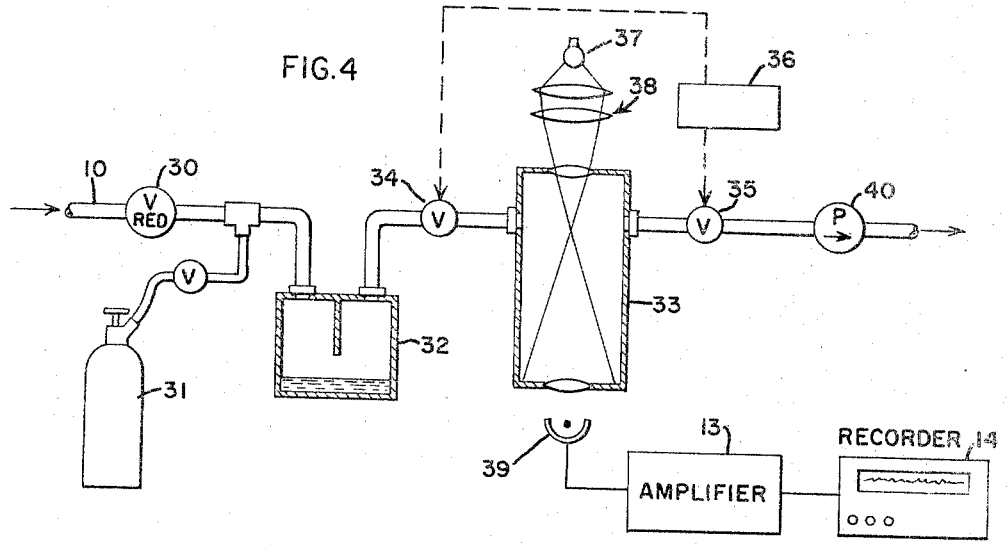

3,427,880
OVERHEATING DETECTOR FOR GAS COOLED ELECTRIC MACHINE
Lloyd P. Grobel, Schenectady, and Chester C. Carson, Ballston Spa. N.Y., assignors to General Electric Company, a corporation of New York
Filed Sept. 12, 1966, Ser. No. 578,855
U.S. Cl. 73—339       6 Claims
Int. Cl. G01k 1/02, 3/00; G08b 21/00

ABSTRACT OF THE DISCLOSURE

A device and method for detecting excessive heating of gas cooled components of an electric machine. The components for which overheating is to be detected are coated with a substance that produces sub-micron decomposition particles at an ascertained temperature. Some of the cooling gas is circulated through a particle detection system, which senses the presence of the sub-micron decomposition particles.

---

This invention relates to an improved arrangement and method for detecting overheating of parts in a gas cooled electric machine. More particularly, the invention relates to an improved device for detecting local overheating of parts in the stator core of a gas cooled dynamoelectric machine, such as the stator laminations.

The electromagnetic core of large A-C equipment, such as transformers and dynamoelectric machines, is sometimes composed of laminations or punchings of silicon iron. These are individually coated with a varnish or resin and assembled in packages which together form slots for the windings and passages for the cooling gas. As is well known, the laminations provide a suitable path for the magnetic flux produced by the windings.

Occasionally it is possible, due to the high flux densities present, to produce overheating of portions of the laminations or other parts of the machine, particularly in the small cross section portions of the laminations such as the stator teeth surrounding the windings. The overheating can cause the coating on the laminations to decompose and aggravate the situation, but the damage often is not detectable in its initial stages until severe damage has occurred.

Accordingly, one object of the present invention is to provide an improved arrangement and a method for detecting local overheating of parts such as stator laminations in a gas cooled electric machine.

A more particular object of the invention is to provide an approved arrangement and method for detecting overheating of the stator teeth in a hydrogen cooled generator.

Still another object of the invention is to provide means for continuously monitoring a gas cooled electric machine while it is in operation to detect a potentially damaging overheating condition.

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is a simplified schematic view of a gas cooled generator, partly in cross section, illustrating the overall arrangement in diagrammatic form, FIG. 2 is an enlarged view of a typical stator lamination.

FIG. 3 is a schematic view of an ion chamber particle detector, for use in FIG. 1, and FIG. 4 is a schematic view of a condensation nuclei detector which can be used as an alternate for the detector shown in FIG. 1.

Briefly stated, the invention comprises utilization of a coating on parts subject to overheating which produces sub-micron decomposition particles at an ascertained local temperature (which coating may consist of the normal coating for the laminations), means to extract cooling gas from the machine, and means to detect the presence of the decomposition particles in the gas stream.

Referring now to FIG. 1 of the drawing, a hydrogen cooled generator 1 is shown as being typical of a gas cooled electric machine with which the present invention can be used to detect overheating. Generator 1 includes a stator 2, a rotor 3, stator windings 4 disposed in slots in the stator core 2, the stator and rotor being enclosed in a gas tight casing 5 filled with a cooling gas, for example, hydrogen. The stator windings themselves may additionally be cooled internally with a liquid. A rotor-mounted fan 6 circulates cooling gas through suitably arranged passages, the disposition of which is immaterial to the present invention, such as the radial ducts 7 disposed between lamination packages 8. The gas is cooled in a heat exchanger 9 and returned to the suction side of fan 6.

Means to withdraw a portion of the gaseous coolant and to detect particles produced by overheating include a pipe 10, a detector 11, and, depending upon the type of detector, a return pipe 12. The pressure differential across heat exchanger 9 will cause gas to flow through the external system. Signals from the detector are amplified in a suitable amplifier 13 and a continuous record provided by strip recorder 14. In order to provide clean gas for checking the validity and the accuracy of the detecting instrument, a three-way valve 15 connects an alternate supply through a bypass filter 16 to the detector inlet in lieu of the normal supply.

It is intended that this means of detecting overheating be used in conjunction with a suitable alarm system which could be connected to the recorder 14 and which would be activated when the detector registered a definite signal. This alarm can be arranged with an automatic validation of the signal.

Lamination packages 8 are made up of thin silicon iron punchings which are shown in FIG. 2 and designated by 17. The punchings include rectangular slots 18 which, when placed together, define slots for the stator windings 4. Although the laminations are packed together, they are separated at intervals by spacers 19 which provide the cooling ducts 7.

Laminations 17 are normally coated with a thin insulating film of resin to prevent contact with adjacent laminations. By way of illustration, a typical composition is a phenolformaldehyde polymer mixed with a drying oil. As will be seen from the examples stated later in the specification, depending upon how the invention is to be employed, either the normal coating mentioned above may be used to produce submicron decomposition particles, or special coatings designed to produce such particles at lower temperatures can be used.

Referring now to FIG. 3 of the drawing, one type of detector which can be used for the detector 11 of FIG. 1 is an ion chamber particle detector 20, which is more particularly described in an application of George F. Skala, Ser. No. 578,884, filed of even date herewith and assigned to the present assignee.

Gas extracted from the generator is introduced through pipe 10 into a pressure container 21 and is subsequently returned to the generator through the outlet pipe 12. The gas flows into an inner ionizing chamber 22 through holes 23 and is subjected to low level radiation by means of a layer 28 of radioactive substance distributed on the inner surface of inner chamber 22. A suitable low-level radiation coating contains thorium 232 which is an alpha source causing formation of positive and negative ion pairs from gas molecules passing through inner chamber 22. The gas enters a collector chamber 24 through holes 25 flowing past an electrode 26 to the gas outlet. Opposite voltage polarities are imposed on the collector chamber 24 and electrode 26 by means of a D–C source 27. Negatively charged ions are collected on the wall of collector chamber 24, this action being assisted by the repulsion from negatively charged electrode 26. The current flowing in a collector lead 29 is amplified in an electrometer amplifier 13 and produces visible traces on the strip recorder 14.

The operation of the ion chamber particle detector when small amounts of sub-micron particles are introduced along with the gas is as follows. Although the particles are very small, they are much larger and less mobile than the molecules of the cooling gas. With sub-micron particles present, the ion pairs attach themselves to the particles resulting in charged particles with much less mobility to drift toward the electrodes as they pass through the apparatus. The result is a drop in current when particles are present, which is readily detectable on the strip of recorder 14.

An alternate type of detector is the simplified condensation nuclei detector shown in FIG. 4. Gas collected from the generator enters the apparatus through pipe 10 as before, is reduced in pressure by reducing valve 30 and diluted with an inert gas such as nitrogen from bottle 31. The diluted mixture passes through a humidifying chamber 32 which saturates the gas with water vapor. An expansion chamber 33 serves to cyclicly expand batches of humified gas when the valves 34, 35 are alternately opened and closed by an automatic rotary valve actuator 36. A light source 37 and lens system 38 causes the scattered light to be detected by photo tube 39. When the adiabatic expansion occurs, the water vapor condenses on the condensation nuclei (here the sub-micron particles). The scattered light intensity falling on photo tube 39 is related to the number of droplets affected by the presence of submicron particles as before. The light-responsive signal is amplified at 13 and recorder 14 provides an indication of the presence of contaminating particles. In contrast to the detector of FIG. 3, the gas is preferably discarded from the outlet of vacuum pump 40. The flow required is very small and this loss is not detrimental to the generator. The cycling operation by actuation of valves 34 and 35 with actuator 36 is relatively rapid, i.e., about five cycles per second, and has the effect of continuous flow through the device. Suitable apparatus could be employed at additional cost to dry the monitored gas and return it to the generator.

The parts of the machine for which it is desired to detect overheating are preferably coated with a polymeric material selected with regard to the operating conditions. In selecting a suitable coating material, the composition of the cooling gas (here hydrogen) and its pressure (here lying in the range of one to six atmospheres) must be considered.

If it is desired that a relatively high temperature be allowed before an indication is given, it may be preferable to utilize the normal coating applied to the laminations, for example, the phenol-formaldehyde polymer referred to previously. This polymer will commence to give off decomposition particles in the neighborhood of 390° C. in a pressurized hydrogen atmosphere. A great number of very small particles are emitted, a large portion of these being on the order of $10^{-3}$ to $10^{-1}$ microns, although much smaller particles are also present in detectable quantities.

Naturally, such continued decomposition of the normal lamination coating would lead to damage of the type it is desired to prevent. Therefore, if preferred, special polymeric materials decomposing at lower temperatures than those which would damage the insulation or other parts of interest may be applied over or in lieu of the previously mentioned coating. These can be applied in areas of particular concern such as on the tips of the stator teeth or inside the slot walls or on the duct spacers 19 shown in FIG. 2. The latter would give an indication of localized high temperature in the cooling ducts or around the stator teeth. Such coating materials employed to give advance warning of potential local damaging temperatures may comprise polyalphamethylstyrene, polystyrene, polymethyl methacrylate or cellulose propionate. These decompose and give off sub-micron decomposition particles rather abruptly as temperatures in the range of 230° to 340° C. are reached in pressurized hydrogen. Other materials emitting decomposition particles at even lower temperatures are feasible.

The use of the invention permits overheating of stator cores to be detected at an early stage, searched for and corrected before significant damage occurs. The only present alternative to detecting over-temperature lies in the use of bulky instrumentation such as thermo couples, and it is impractical to locate temperature detectors in all parts of the stator core. Although closed cooling systems are illustrated in the example, open air cooled systems may also find applications of the invention. The invention provides a very simple means of providing monitoring of the complete machine in operation so as to give warning of stator core trouble before serious damage occurs.

Although the overheating of an area to produce the decomposition particles will result in a discernible change in the appearance of the area, the location of an area that has been subjected to a minimum of overheating can be facilitated by the use of a temperature indicating paint or pigment, applied either as a separate coat or mixed in with a light-colored paint such as the epoxy paint used in some generators. A suitable temperature indicator is Detecto Temp 915–0925, a pigment sold by H. V. Hardman Co., Inc., of Belleville, N.J., which changes from gray-green to yellow at 145° C. and from yellow to brown-black at 220° C.

While there is shown what is considered at present to be the preferred embodiment of the invention, it is of course understood that various other modifications may be made therein.

What is claimed is:

1. An over-temperature detector for a gas cooled electric machine having parts therein subject to over-heating during operation, comprising:
   a coating of material on said machine parts selected to produce sub-micron particles upon over-heating,
   means circulating cooling gas over said machine portions to entrain said particles,
   conduit means arranged to withdraw a test portion of said gas during operation of the machine, and
   detector means arranged to monitor said test portion of the gas and provide an over-temperature indication when said sub-micron particles are present.

2. The combination according to claim 1, wherein said detector means comprises an ion chamber particle detector continuously monitoring gas withdrawn from the electric machine by subjecting the test portion to a radioactive source and measuring the ion current flow.

3. The combination according to claim 1, wherein said detector means comprises a condensation nuclei detector arranged to humidify and expand the test portion and measure the light intensity therethrough.

4. The combination according to claim 1, wherein said coating for said parts comprises a polymeric material selected to produce said sub-micron particles by decomposition upon reaching a preselected temperature above normal operating temperatures of said parts.

5. An over-temperature detector for a hydrogen cooled generator having stator laminations therein with portions subject to possible overheating in operation, comprising:
a coating of polymeric material on said lamination portions selected to produce sub-micron particles by decomposition upon reaching a preselected temperature,
means recirculating cooling gas over said lamination portions so as to entrain said particles,
conduit means connected to withdraw a portion of the cooling gas and to return it to the generator,
an ion chamber particle detector operatively interposed in said conduit means so as to continuously monitor said withdrawn gas to sense the presence of particles therein, and
a recorder operatively connected with said ion chamber particle detector to provide a continuous indication of particles in the generator cooling gas.

6. A method of detecting overheating in an electric machine having cooling gas recirculating over parts subject to overheating while the machine is operating, comprising:
providing a coating of material on said parts selected to produce sub-micron particles on reaching a selected temperature,
extracting a portion of said cooling gas from the machine, and
monitoring said extracted gas for the presence of said particles to detect overheating.

References Cited

UNITED STATES PATENTS 3,329,022  5/1967  Feldman _____ 73—339

FOREIGN PATENTS 398,722  9/1933  Great Britain.

LOUIS R. PRINCE, *Primary Examiner.*

DENIS E. CORR, *Assistant Examiner.*

U.S. Cl. X.R.

340—227, 237